United States Patent
Guo

(10) Patent No.: US 9,268,718 B2
(45) Date of Patent: Feb. 23, 2016

(54) SIGNAL COLLECTION SYSTEM WITH FREQUENCY REDUCTION UNIT AND SIGNAL COLLECTION METHOD

(75) Inventor: Li-Wen Guo, Shenzhen (CN)

(73) Assignee: ScienBziP Consulting(Shenzhen)Co., Ltd., Shenzhen (CN)

( * ) Notice: Subject to any disclaimer, the term of this patent is extended or adjusted under 35 U.S.C. 154(b) by 598 days.

(21) Appl. No.: 13/598,754

(22) Filed: Aug. 30, 2012

(65) Prior Publication Data
US 2013/0124906 A1 May 16, 2013

(51) Int. Cl.
*G06F 3/00* (2006.01)
*G06F 13/12* (2006.01)

(52) U.S. Cl.
CPC ................ *G06F 13/122* (2013.01); *G06F 3/00* (2013.01)

(58) Field of Classification Search
USPC .................. 710/25, 27, 61, 71, 305, 105, 106
See application file for complete search history.

(56) References Cited

U.S. PATENT DOCUMENTS

| | | | |
|---|---|---|---|
| 6,282,144 B1 * | 8/2001 | Batson et al. | 365/230.05 |
| 6,370,200 B1 * | 4/2002 | Takahashi | 375/257 |
| 7,746,724 B2 * | 6/2010 | Mayer et al. | 365/233.14 |
| 7,870,318 B2 * | 1/2011 | Karaki | 710/105 |
| 7,940,580 B2 * | 5/2011 | Schreiber et al. | 365/189.11 |

\* cited by examiner

*Primary Examiner* — Khanh Dang
(74) *Attorney, Agent, or Firm* — Novak Druce Connolly Bove + Quigg LLP

(57) ABSTRACT

An exemplary signal collection system includes a signal transmitting module and a computer. The signal transmitting module outputs a high-speed signal with a high frequency. The signal collection system further includes a data collection module interconnecting the signal transmitting module and the computer. The data collection module includes a frequency reduction unit. The frequency reduction unit reduces the frequency of the high-speed signal output from the signal transmitting module and outputs the high-speed signal with a reduced frequency to the computer. A signal collection method based upon the signal collection system is also disclosed.

9 Claims, 3 Drawing Sheets

US 9,268,718 B2

SIGNAL COLLECTION SYSTEM WITH FREQUENCY REDUCTION UNIT AND SIGNAL COLLECTION METHOD

CROSS-REFERENCE TO RELATED APPLICATIONS

This application claims all benefits accruing under 35 U.S.C. §119 from China Patent Application No. 201110361336.7, filed on Nov. 15, 2011 in the China Intellectual Property Office, the contents of which are hereby incorporated by reference. Relevant subject matter is disclosed in: co-pending U.S. Patent Application entitled "SIGNAL COLLECTION SYSTEM AND METHOD WITH SIGNAL DELAY,"Application No. [to be advised], filed on the same day as the present application; co-pending U.S. Patent Application entitled "SIGNAL COLLECTION SYSTEM AND METHOD WITH SIGNAL DELAY,"Application No. [to be advised], filed on the same day as the present application; and co-pending U.S. Patent Application entitled "SIGNAL COLLECTION SYSTEM WITH FREQUENCY REDUCTION MODULE AND SIGNAL COLLECTION METHOD,"US Application No. [to be advised], filed on the same day as the present application. This application and the three co-pending U.S. Patent Applications are commonly owned, and the contents of the three co-pending U.S. Patent Applications are hereby incorporated by reference.

BACKGROUND

1. Technical Field

The disclosure generally relates to signal collection systems and methods, and particularly relates to high-frequency signal collection systems and methods.

2. Description of Related Art

In quantum communication systems or other high-speed communication systems, multi-path high-speed signals are often times transmitted simultaneously in order to increase data transmission speed and improve data throughput. However, the high-speed signals may result in signal distortion and low accuracy of data collection, because the frequencies of the high-speed signals are often far greater than the maximum operating frequency of a data collection interface.

Therefore, there is a need to provide a high-accuracy signal collection system and method for processing high-speed, high-frequency signals.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

In general, the word "module," as used herein, refers to logic embodied in hardware or firmware, or to a collection of software instructions, written in a programming language, such as Java, C, or assembly. One or more software instructions in the modules may be embedded in firmware, such as in an erasable-programmable read-only memory (EPROM). The modules described herein may be implemented as either software and/or hardware modules and may be stored in any type of non-transitory computer-readable medium or other storage device. Some non-limiting examples of non-transitory computer-readable media are compact discs (CDs), digital versatile discs (DVDs), Blu-Ray discs, Flash memory, and hard disk drives.

Figure 1:
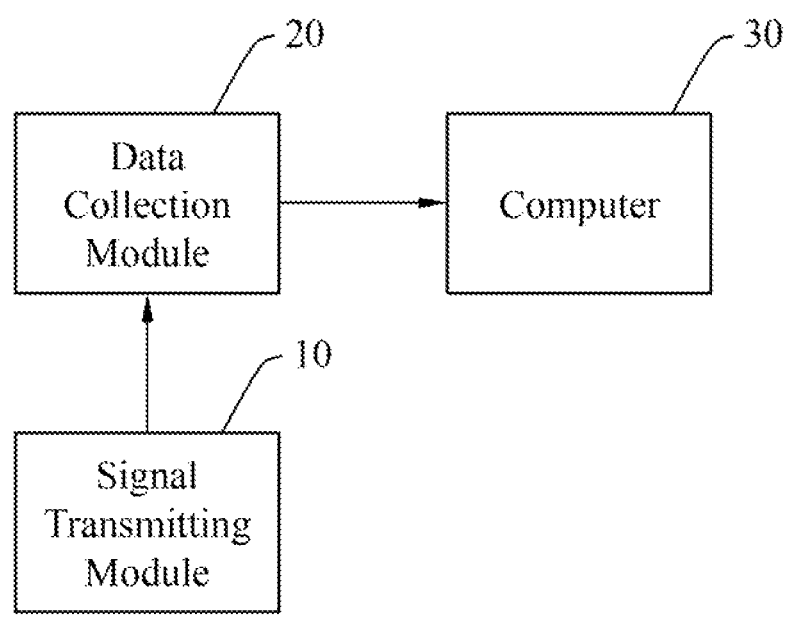
FIG. 1 is a block diagram of a signal collection system according to one embodiment.

FIG. 1 shows a signal collection system according to one embodiment. The signal collection system includes a signal transmitting module 10, a data collection module 20, and a computer 30. The data collection module 20 interconnects the signal transmitting module 10 and the computer 30. The signal transmitting module 10 may generate and output high-speed signals with high frequencies. The data collection module 20 may collect the high-speed signals output from the signal transmitting module 10, and transmit the high-speed signals to the computer 30. The computer 30 may store and process the high-speed signals output from the signal transmitting module 10.

Figure 2:
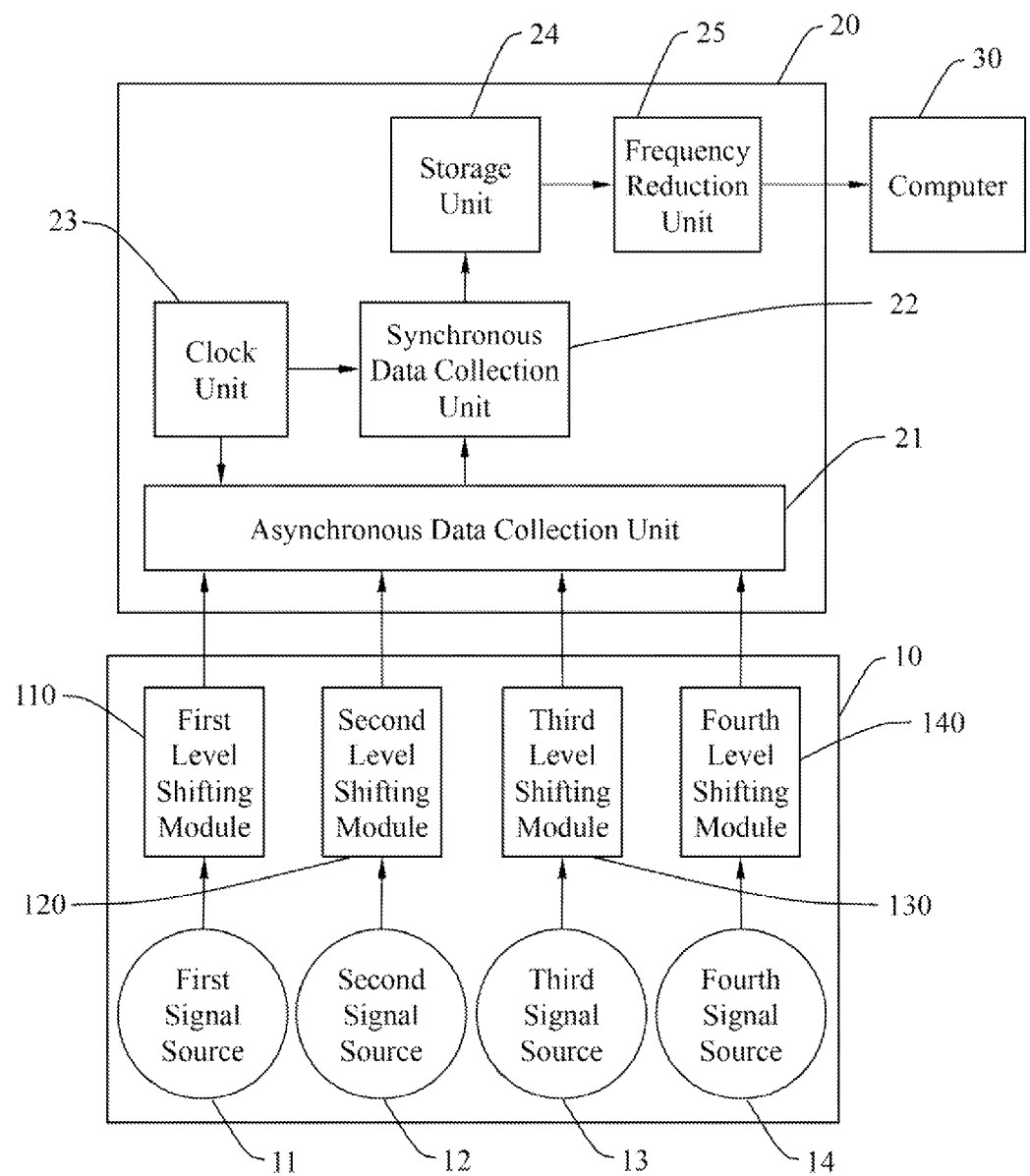
FIG. 2 is a detailed functional block diagram of the signal collection system of FIG. 1.

In some embodiments, the signal transmitting module 10 includes multiple signal sources that may generate and output multi-path high-speed signals with high frequencies. Referring to FIG. 2, the signal transmitting module 10 includes a first signal source 11, a second signal source 12, a third signal source 13, a fourth signal source 14, a first level shifting module 110, a second level shifting module 120, a third level shifting module 130, and a fourth level shifting module 140. Each of the signal sources of the signal transmitting module 10 may generate and output a high-speed signal.

The first level shifting module 110 is connected to the first signal source 11, and may accept and adapt levels of the high-speed signal generated from the first signal source 11 to the data collection module 20. For example, when the data collection module 20 can only receive signals with a low level of 0V (volts) and a high level of +5V and the first signal source 11 can only output a signal with a low level of 0V and a high level of +2V, the first level shifting module 110 converts the +2V of the signal output from the first signal source 11 into +5V. The second level shifting module 120 is connected to the second signal source 12, and may adapt levels of the high-speed signal generated by the second signal source 12 to the data collection module 20. The third level shifting module 130 is connected to the third signal source 13, and may adapt levels of the high-speed signal generated by the third signal source 13 to the data collection module 20. The fourth level shifting module 140 is connected to the fourth signal source 14, and may adapt levels of the high-speed signal generated by the fourth signal source 14 to the data collection module 20. The first level shifting module 110, the second level shifting module 120, the third level shifting module 130, and the fourth level shifting module 140 are connected to the data collection module 20, and may output the high-speed signals with shifted levels to the data collection module 20.

The data collection module 20 includes an asynchronous data collection unit 21, a synchronous data collection unit 22, a clock unit 23, a storage unit 24, and a frequency reduction unit 25.

The asynchronous data collection unit 21 is connected to each of the first to fourth level shifting modules 110 to 140. The asynchronous data collection unit 21 may asynchronously collect the multi-path high-speed signals output from the first to fourth level shifting modules 110 to 140. The asynchronous collection performed by the asynchronous data collection unit 21 does not require a consistent clock time for the first to fourth level shifting modules 110 to 140 and the asynchronous data collection unit 21. Therefore, the asynchronous data collection unit 21 may receive signals with arbitrary and varying frequencies, and reduce any interference of the multi-path high-speed signals generated by the signal transmitting module 10 itself.

The synchronous data collection unit 22 is connected to the asynchronous data collection unit 21, and may synchronously collect the multi-path high-speed signals output from the asynchronous data collection unit 21. The synchronous collection performed by the synchronous data collection unit 22 requires a consistent clock time for the asynchronous data collection unit 21 and the synchronous data collection unit 22, and thus may increase the speed of data transmission.

The clock unit 23 is connected to each of the asynchronous dada collection unit 21 and the synchronous data collection unit 22. The clock unit 23 may generate clock signals with a uniform clock frequency, and output the clock signals to the asynchronous data collection unit 21 and the synchronous data collection unit 22.

The storage unit 24 is connected to each of the synchronous data collection unit 22 and the frequency reduction unit 25. The storage unit 24 may buffer the high-speed signals output from the synchronous data collection unit 22, and then transmit the high-speed signals to the frequency reduction unit 25.

The frequency reduction unit 25 may reduce the frequencies of the high-speed signals output from the storage unit 24 to adapt the high-speed signals for the computer 30. The frequency reduction unit 25 may then transmit the high-speed signals with reduced frequencies to the computer 25.

When receiving the high-speed signals with the reduced frequencies output from the frequency reduction unit 25, the computer 30 may restore the high-speed signals and extract information carried by the high-speed signals.

Figure 3:
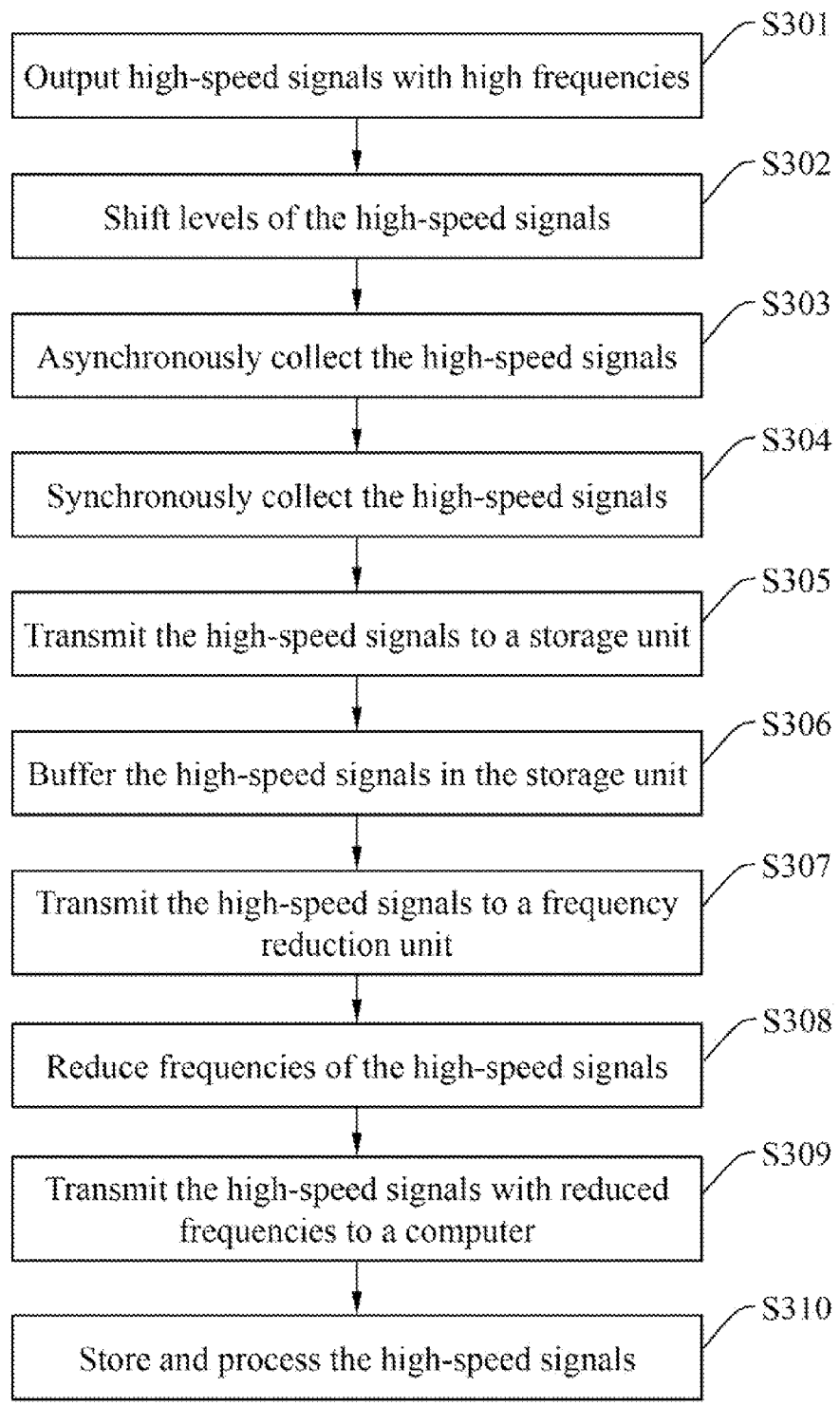
FIG. 3 is a flowchart showing one embodiment of a method for signal collection using the signal collection system of FIG. 2.

FIG. 3 is a flowchart showing one embodiment of a signal collection method using the signal collection system of FIG. 2. The method comprises the following steps.

In step S301, the first signal source 11, the second signal source 12, the third signal source 13, and the fourth signal source 14 output multi-path high-speed signals with high frequencies to the first to fourth level shifting modules 110 to 140, respectively.

In step S302, the first to fourth level shifting modules 110 to 140 shift the levels of the multi-path high-speed signals output from the first to fourth signal sources 11 to 14, respectively, to enable adoption and acceptance of the high-speed signals by the data collection module 20.

In step S303, the asynchronous data collection unit 21 asynchronously collects the multi-path high-speed signals with shifted levels output from the first to fourth level shifting modules 110 to 140.

In step S304, the synchronous data collection unit 22 synchronously collects the multi-path high-speed signals output from the asynchronous data collection unit 21.

In step S305, the synchronous data collection unit 22 transmits the multi-path high-speed signals to the storage unit 24.

In step S306, the storage unit 24 buffers the multi-path high-speed signals output from the synchronous data collection unit 22. The storage unit 24 may store the multi-path high-speed signals in various storage areas corresponding to the multi-path high-speed signals. For example, when the high-speed signals transmitted from the four signal sources 11-14 are respectively at a high level (1), a low level (0), a low level (0), and a high level (1), the storage unit 24 stores the high-speed signals in a storage area starting with a storage address 0x1001. In another example, when the high-speed signals transmitted from the four signal sources 11-14 are respectively at a low level (0), a high level (1), a high level (1), and a high level (1), the storage unit 24 stores the high-speed signals in a storage area starting with a storage address 0x0111.

In step S307, the storage unit 24 transmits the buffered high-speed signals to the frequency reduction unit 25.

In step S308, the frequency reduction unit 25 reduces frequencies of the high-speed signals output from the storage unit 24 to adapt the high-speed signals for the computer 30.

In step S309, the frequency reduction unit 25 transmits the high-speed signals with reduced frequencies to the computer 30.

In step S310, the computer 30 stores the high-speed signals output from the frequency reduction unit 25, and processes the high-speed signals to extract the information carried by the high-speed signals.

Although numerous characteristics and advantages have been set forth in the foregoing description of embodiments, together with details of the structures and functions of the embodiments, the disclosure is illustrative only, and changes may be made in detail, especially in the matters of arrangement of parts within the principles of the disclosure to the full extent indicated by the broad general meaning of the terms in which the appended claims are expressed.

Depending on the embodiment, certain steps or methods described may be removed, others may be added, and the sequence of steps may be altered. The description and the claims drawn to or in relation to a method may give some indication in reference to certain steps. However, any indication given is only to be viewed for identification purposes, and is not necessarily a suggestion as to an order for the steps.

What is claimed is:

1. A signal collection system, comprising:
a computer;
a signal transmitting module adapted to output a high-speed signal with a high frequency; and
a data collection module interconnecting the computer and the signal transmitting module, wherein the data collection module comprises a frequency reduction unit adapted to reduce the frequency of the high-speed signal and send the high-speed signal with a reduced frequency to the computer,
wherein the data collection module further comprises an asynchronous data collection unit connecting to the signal transmitting module, the asynchronous data collection unit is adapted to asynchronously collect and reduce any interference of the high-speed signal output from the signal transmitting module, the data collection module further comprises a synchronous data collection unit connecting to the asynchronous data collection unit, the synchronous data collection unit is adapted to synchronously collect the high-speed signal output from the asynchronous data collection unit, the data collection module further comprises a clock unit connecting to the asynchronous data collection unit and the synchronous data collection unit, the clock unit is adapted to generate clock signals with a uniform clock frequency and output the clock signals to the asynchronous data collection unit and the synchronous data collection unit.

2. The signal collection system of claim 1, wherein the data collection module further comprises a storage unit connecting to the synchronous data collection module and the frequency reduction unit, the storage unit is adapted to buffer the high-speed signal output from the synchronous data collection unit and transmit the high-speed signal to the frequency reduction unit.

3. The signal collection system of claim 1, wherein the signal transmitting module comprises a signal source and at a shifting module connecting to the signal source, the level shifting module is adapted to shift levels of the high-speed signal generated from the signal source and output the high-speed signal with shifted levels to the data collection module.

4. A signal collection method, comprising:
  outputting a high-speed signal with a high frequency generated from a signal source to a data collection module;
  asynchronously collecting the high-speed signal generated from the signal source by an asynchronous data collection unit to collect and reduce any interference of the high-speed signal output;
  synchronously collecting the high-speed signal output from the asynchronous data collection unit by a synchronous data collection unit;
  outputting clock signals with a uniform clock frequency to the asynchronous data collection unit and the synchronous data collection unit by a clock unit;
  reducing the frequency of the high-speed signal by the data collection module;
  transmitting the high-speed signal with a reduced frequency to a computer; and
  processing the high-speed signal by the computer.

5. The signal collection method of claim 4, further comprising buffering the high-speed signal output from the synchronous data collection unit by a storage unit.

6. The signal collection method of claim 4, further comprising shifting levels of the high-speed signal generated from the signal source and outputting the high-speed signal with shifted levels to the data collection module.

7. A signal collection method, comprising:
  providing a computer, a signal source, and a data collection module interconnecting the computer and the signal source;
  providing an asynchronous data collection unit;
  the asynchronous data collection unit asynchronously collecting and reducing any interference of the high-speed signal output from the signal source;
  providing a synchronous data collection unit;
  synchronously collecting the high-speed signal output from the asynchronous data collection unit by the synchronous data collection unit;
  providing a clock unit;
  outputting, by the clock unit, clock signals with a uniform clock frequency to the asynchronous data collection unit and the synchronous data collection unit;
  outputting, by the signal source, a high-speed signal with a high frequency to the data collection module;
  reducing the frequency of the high-speed signal by the data collection module;
  transmitting, by the data collection module, the high-speed signal with a reduced frequency to the computer; and
  processing the high-speed signal by the computer.

8. The signal collection method of claim 7, further comprising:
  providing a storage unit connected to each of the synchronous data collection unit; and
  buffering the high-speed signal output from the synchronous data collection unit by the storage unit.

9. The signal collection method of claim 7, further comprising:
  providing a shifting module connected to the signal source; and
  shifting levels of the high-speed signal output from the signal source and outputting the high-speed signal with shifted levels to the data collection module.

* * * * *